(12) United States Patent
Di Mattia

(10) Patent No.: US 11,153,350 B2
(45) Date of Patent: Oct. 19, 2021

(54) DETERMINING ON-NET/OFF-NET STATUS OF A CLIENT DEVICE

(71) Applicant: Fortinet, Inc., Sunnyvale, CA (US)

(72) Inventor: Aldo Di Mattia, Rome (IT)

(73) Assignee: Fortinet, Inc., Sunnyvale, CA (US)

( * ) Notice: Subject to any disclaimer, the term of this patent is extended or adjusted under 35 U.S.C. 154(b) by 170 days.

(21) Appl. No.: 16/572,218

(22) Filed: Sep. 16, 2019

(65) Prior Publication Data

US 2021/0084079 A1 Mar. 18, 2021

(51) Int. Cl.
*H04L 29/06* (2006.01)
*H04L 29/12* (2006.01)

(52) U.S. Cl.
CPC ........ *H04L 63/205* (2013.01); *H04L 61/1511* (2013.01); *H04L 61/2007* (2013.01); *H04L 61/6022* (2013.01); *H04L 63/1441* (2013.01)

(58) Field of Classification Search
CPC ............... H04L 63/205; H04L 61/1511; H04L 61/6022; H04L 67/1002
USPC .......................................................... 726/1
See application file for complete search history.

(56) References Cited

U.S. PATENT DOCUMENTS

| | | | | |
|---|---|---|---|---|
| 8,918,883 B1* | 12/2014 | Boyle | ............... | H04L 63/1433 726/25 |
| 9,065,863 B1* | 6/2015 | Tharakan | ............ | H04L 61/1511 |
| 9,465,668 B1* | 10/2016 | Roskind | .................. | H04L 67/10 |
| 10,382,401 B1* | 8/2019 | Lee | ........................ | H04L 67/10 |
| 10,547,623 B1* | 1/2020 | Han | ..................... | H04L 63/1408 |
| 2006/0021031 A1* | 1/2006 | Leahy | ................. | H04L 63/1483 726/22 |
| 2007/0217407 A1* | 9/2007 | Yuan | ................... | H04L 61/2528 370/389 |
| 2014/0165164 A1* | 6/2014 | Pizurica | ............... | G06F 3/0482 726/5 |
| 2014/0282816 A1* | 9/2014 | Xie | ..................... | H04L 63/0227 726/1 |
| 2015/0180891 A1* | 6/2015 | Seward | .............. | H04L 63/1425 726/22 |
| 2016/0134634 A1* | 5/2016 | Rosendal | ............... | H04L 63/10 726/4 |
| 2016/0226819 A1* | 8/2016 | Manadhata | ......... | H04L 61/1511 |
| 2016/0248753 A1* | 8/2016 | Dictos | ...................... | G06F 8/65 |
| 2017/0078312 A1* | 3/2017 | Yamada | ............. | H04L 63/1416 |

(Continued)

OTHER PUBLICATIONS

Khajeh-Hosseini et al., "Decision Support Tools for Cloud Migration in the Enterprise", 2011 (Year: 2011).*

(Continued)

*Primary Examiner* — Ondrej C Vostal

(57) ABSTRACT

Systems and methods are described for determining an on-net/off-set status of a client device. An endpoint security program running on the client device maintains an enterprise public Internet Protocol (IP) list containing one or more ranges of public IP addresses associated with an enterprise network. Further, the endpoint security program sends a request to a cloud-based service for information regarding a public IP address of the client device. In response to the request, the endpoint security program receives from the cloud-based service a response containing the public IP address and determines a connection status of the client device with respect to the enterprise network by comparing the public IP address to the enterprise public IP list.

19 Claims, 11 Drawing Sheets

(56) References Cited

U.S. PATENT DOCUMENTS

| | | | |
|---|---|---|---|
| 2017/0279769 A1* | 9/2017 | Jachniuk | H04L 63/20 |
| 2018/0219818 A1* | 8/2018 | Kramer | G06Q 30/0277 |
| 2018/0375894 A1* | 12/2018 | Vervier | H04L 61/2007 |
| 2019/0012365 A1* | 1/2019 | Liu | G06F 9/5083 |
| 2019/0141067 A1* | 5/2019 | Rodriguez | H04L 63/1425 |
| 2019/0281072 A1* | 9/2019 | Al Khater | H04L 63/1408 |
| 2020/0099659 A1* | 3/2020 | Cometto | H04L 67/1002 |

OTHER PUBLICATIONS

ExtremeNetworks.com, "Enterprise Networking", 2021 (Year: 2021).*
Microsoft Computer Dictionary, "enterprise network", 5th edition, 2002, p. 194 (Year: 2002).*
Fortinet, "FortiClient—Administration Guide", Version 6.0.3, Nov. 6, 2018, 139 pages.

* cited by examiner

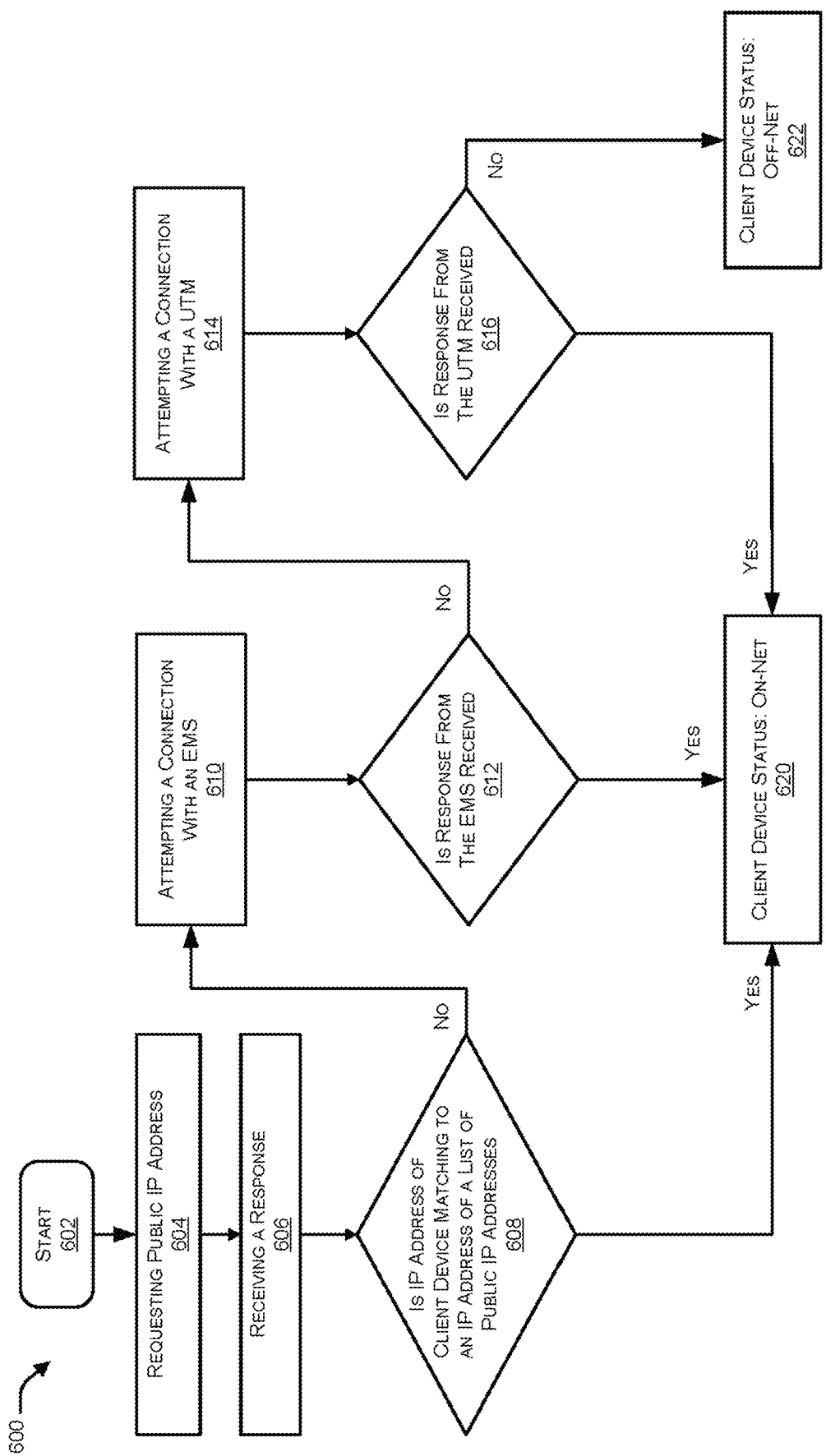

FIG. 7

DETERMINING ON-NET/OFF-NET STATUS OF A CLIENT DEVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to cyber security. In particular, embodiments of the present invention relate to determining, by an integrated endpoint security suite running on an endpoint, the endpoint's on-net/off-net status with respect to a private network.

Description of the Related Art

An integrated endpoint security suite, such as the FORTICLIENT endpoint security solution (available from Fortinet, Inc. of Sunnyvale, Calif.), uses information regarding its connection status (i.e., on-net and off-net) with respect to a private network to, among other things, enable, disable and/or configure various features, including security features. For example, when the endpoint is off-net a virtual private networking (VPN) auto-connect feature may be configured to automatically create a VPN connection to a VPN endpoint (e.g., a network security device, such as a FORTIGATE next generation firewall, available from Fortinet, Inc. of Sunnyvale, Calif.) within the private network.

One method of determining an endpoint's on-net/off-net status by an endpoint security solution involves an administrator of the private network configuring the endpoint security solution with information regarding all internal network of the private network. The administrator may input subnets (e.g., 10.0.1.0/24 and 10.0.2.0/24) associated with the private network as well as media access control (MAC) addresses (e.g., aa.bb.cc.dd.ee.ff and aa.bb.cc.dd.ee.gg) for the gateways of each subnet. Based on this information, the endpoint security solution can determine if it is on-net when it is connected to one of the configured subnets and when the MAC address of its default gateway matches that which is expected for the subnet.

In a local area network (LAN), maintaining the MAC address of the gateway of connected sub networks of the network is straightforward and can be updated as necessary without much effort. Notably, however, an enterprise can have thousands of networks associated with hundreds of sites. Meanwhile, in view of, among other things, general network configuration changes and potential changes to the router MAC address (RMA) as a result of equipment movement and/or replacement, for example, it may be difficult for the administrator to keep the endpoint security solutions in sync with the current state of the enterprise network, which can result in inaccurate on-net/off-net status determinations. In view of the foregoing, there is a need for an efficient way of determining an on-net/off-net status of an endpoint device.

SUMMARY

Systems and methods are described for determining an on-net/off-set status of a client device. According to various aspects of the present disclosure, an endpoint security program running on a client device maintains an enterprise public Internet Protocol (IP) list containing one or more ranges of public IP addresses associated with an enterprise network. Further, the endpoint security program sends a request to a cloud-based service for information regarding a public IP address of the client device. In response to receipt of the request, the endpoint security program receives a response from the cloud-based service, where the response contains the public IP address. Further, the endpoint security program determines a connection status of the client device with respect to the enterprise network by comparing the received public IP address to the ranges of IP addresses contained in the enterprise public IP list.

According to an embodiment, the endpoint security program maintains a list of subnets and corresponding gateway media access control (MAC) addresses associated with the enterprise network. When the connection status indicates that the client device is not connected to the enterprise network, then the endpoint security program attempts to connect to a client manager device based on one or more of a subnet to which the client device is connected and a default gateway IP address configured for the client device. Upon the attempt being successful, the connection status of the client device is set to a value indicating that the client device is connected to the enterprise network.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 6A illustrates an exemplary flow diagram illustrating a serial process for determining a status of the client device by performing first, second and third connection status checks in accordance with an embodiment of the present invention.

FIG. 7 illustrates an exemplary client enterprise management interface for determination of the client device status in accordance with an embodiment of the present invention.

DETAILED DESCRIPTION

Figure 1:
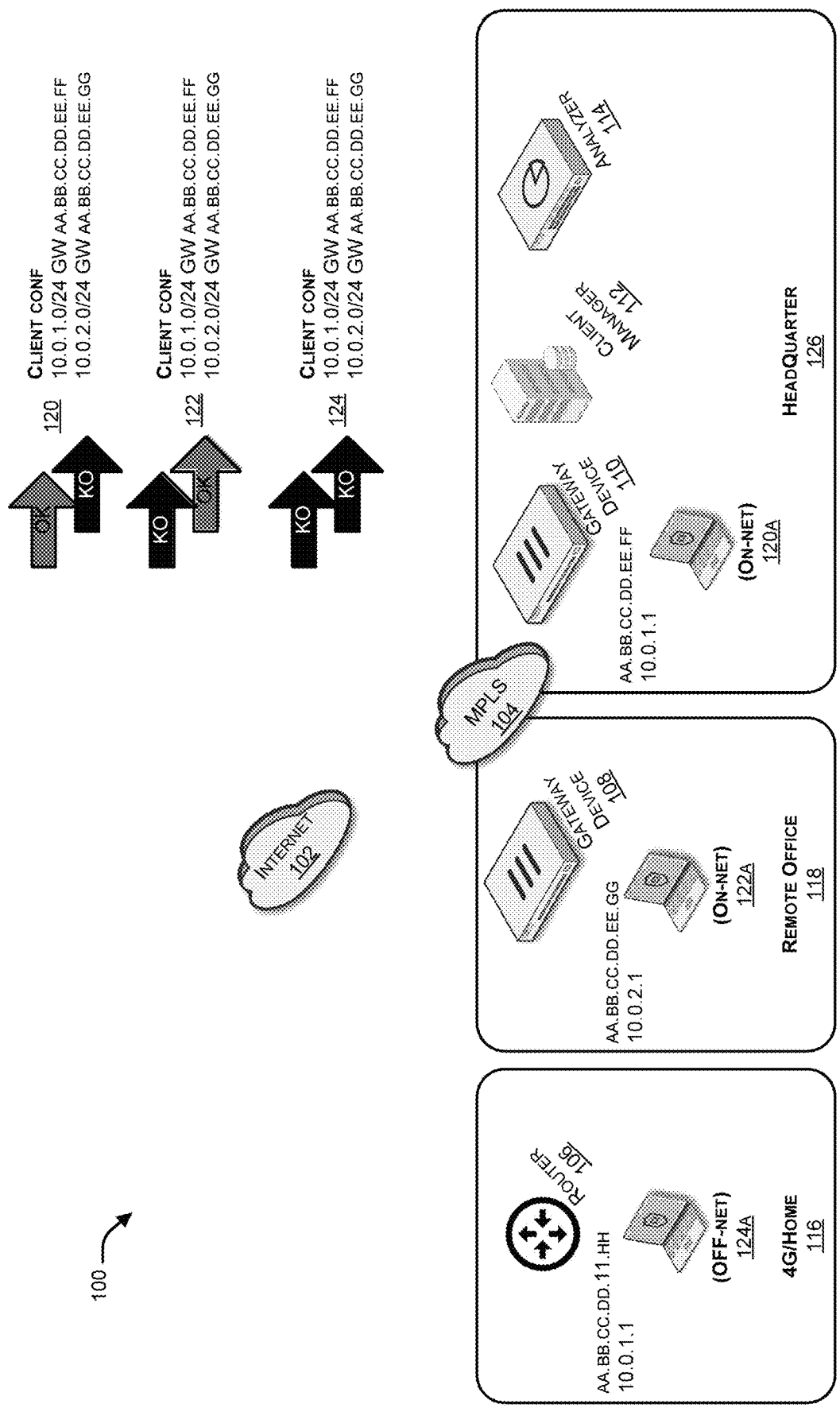
FIG. 1 illustrates a generalized view of a prior art approach for determining a status of a client device in a network.

Systems and methods are described for determining of an on-net/off-set status of a client device. In one embodiment, multiple on-net/off-net status checks can be performed by an endpoint security solution running on a client device to determine the client device's connection status with respect to an enterprise network. A first connection status check may involve the endpoint security solution maintaining a list of one or more ranges of public Internet Protocol (IP) addresses associated with the enterprise network and comparing information obtained by the endpoint security solution regarding the client device's public IP address to the list. A second connection status check may involve determining whether a connection can be established with a first type of client management entity (e.g., an Enterprise Management Server (EMS)). A third connection status check may involve determining whether a connection can be established with a second type of client management entity (e.g., a network security device that manages, among other things, security compliance of the client device with security policies of the enterprise network). In one embodiment, multiple connection status checks can be performed in parallel and their results can be combined as a logical OR condition. That is, if any of the multiple on-net/off-net connection status checks indicate the client device is connected to the enterprise network, then the connection status of the client device with respect to the enterprise network is on-net. In another embodiment, multiple connection status checks may be performed sequentially until one results in an on-net determination or until all connection status checks have been exhausted.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "on-net" when used to describe a client device's status generally means the client device is connected to an enterprise network that the client device is configured to recognize. For example, an endpoint security solution installed on the client device may have been configured directly or indirectly by a network administrator of the enterprise network to recognize certain conditions indicative of the client device being connected to the enterprise network (e.g., any portion of a WAN making up the enterprise network, including a LAN of a branch office or the LAN of the main office or headquarters). In one embodiment, a client device may employ multiple (e.g., three) connection status checks to determine its on-net status. One reason for employing multiple connection status checks is due to the difficulty of keeping client devices in sync with the current state of the enterprise network as noted above in the Background. As such, to the extent the configuration information that would normally facilitate a client device determining its on-net/off-net status is out-of-date, and the connection status check relying on that configuration information fails, there are two other connection status checks that can be used. In one embodiment, the multiple status checks may be independent of one another and may be used individually or in combination. In one embodiment, if any one of the multiple status checks indicates an on-net status, the client device is considered to be on-net.

The term "off-net" when used to describe a client device's status generally means the client device is not connected to an enterprise network that the client device is configured to recognize.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Systems and methods are described for determining an on-net/off-set status of a client device. According to an aspect, an endpoint security program running on a client device maintains an enterprise public IP list containing one or more ranges of public IP addresses associated with an enterprise network. Further, the endpoint security program sends a request to a cloud-based service for information regarding a public IP address of the client device. In response to receipt of the request, the endpoint security program receives from the cloud-based service, a response containing the public IP address of the client device, and determines a connection status of the client device with respect to the enterprise network by comparing the public IP address to the enterprise public IP list.

In an embodiment, on-net/off-net status of the client device can be determined using an endpoint security solution running on the client device, which performs multiple on-net/off-net status checks with respect to an enterprise network. A first connection status check can employ a client device to maintain a list of a range of public IP addresses associated with the enterprise network. The client device requests a network device (implemented in a cloud) to provide IP address of the client device. The received IP address from the network device is compared to the maintained list of IP addresses to determine the connection status of the client device with respect to the enterprise network. Further, a second connection status check can involve determining whether a connection can be established with a first type of client management entity (e.g., an Enterprise Management Server (EMS)). Furthermore, a third connection status check can involve determining whether a connection can be established with a second type of client management entity (e.g., a network security device). The multiple connection status checks can be performed in parallel and results obtained can be combined as a logical OR condition. This implies that if any of the multiple on-net/off-net connection status checks indicate that the client device is connected to the enterprise network, the connection status of the client device with respect to the enterprise network is declared as on-net otherwise as off-net. In another embodiment, the multiple discussed connection status checks can be performed sequentially until one of the checks results in an on-net determination or until all connection status checks have been exhausted.

FIG. 1 illustrates a generalized view 100 of a prior art approach for determining an on-net/off-net status of a client device 120a, 122a and 124a with respect to an enterprise Wide Area Network (WAN). In the context of FIG. 1, remote office 118 and headquarters 126 are coupled in communication via a Wide Area Network (WAN). Client devices located at the headquarters 126, which includes subnet 10.0.1.1, a gateway device 110 having a MAC address of aa.bb.cc.dd.ee.ff, a client manager 112 and an analyzer 114, and the remote office 118, which includes subnet 10.0.2.1, a gateway device 108 having a MAC address of aa.bb.cc.dd.ee.gg, can each be connected to the WAN via one or more routing techniques (e.g., Multiprotocol Label Switching (MPLS) 104) that are designed to speed up and shape traffic flows across enterprise wide area and service provider networks. A client device 124a present in 4G/home endpoint location 116 can be connected to the WAN via a router 106 for accessing Internet 102.

An administrator can input on-net/off-net configuration information in the form of a range or list of subnets associated with the enterprise's WAN (e.g., 10.0.1.0/24 and 10.0.2.0/24) and MAC address for gateways of each subnet (e.g., aa.bb.cc.d.ee.ff and aa.bb.cc.dd.ee.gg). This configuration information 120, 122, and 124 may be maintained by an endpoint security solution running on the respective client devices. When the integrated endpoint security suite observes the network environment it is currently operating within matches any of the lines of the configuration information 120, 122, and 124, then it is on-net; otherwise, it is off-net.

As such, when client 120a is connected to a local area network (LAN) of the headquarters 126, the network environment observed by the endpoint security solution matches the first line of configuration information 120, but not the second line of configuration information 120. and thus client device 120a can be assigned an on-net status.

Turning now to client 122a, which is connected to a LAN associated with the remote office 118, the endpoint security solution sees that it is connected to subnet 10.0.2.1 and includes a gateway device 108 having a MAC address of aa.bb.cc.dd.ee.gg. Therefore, the network environment observed by the endpoint security solution matches the second line of configuration information 122, but not the first line of configuration information 122; thus, client device 122a is also considered to be on-net.

Referring now to client 124a, which is connected to a 4G/home network, the endpoint security solution running on client 124a sees that it is connected to subnet 10.0.1.1 and includes a router 106 having a MAC address of aa.bb.cc.dd.ee.hh. Therefore, the network environment observed by the endpoint security solution does not match either the first line of configuration information 124 or the second line of configuration information 124; thus, client device 124a is considered to be off-net.

Figure 2:
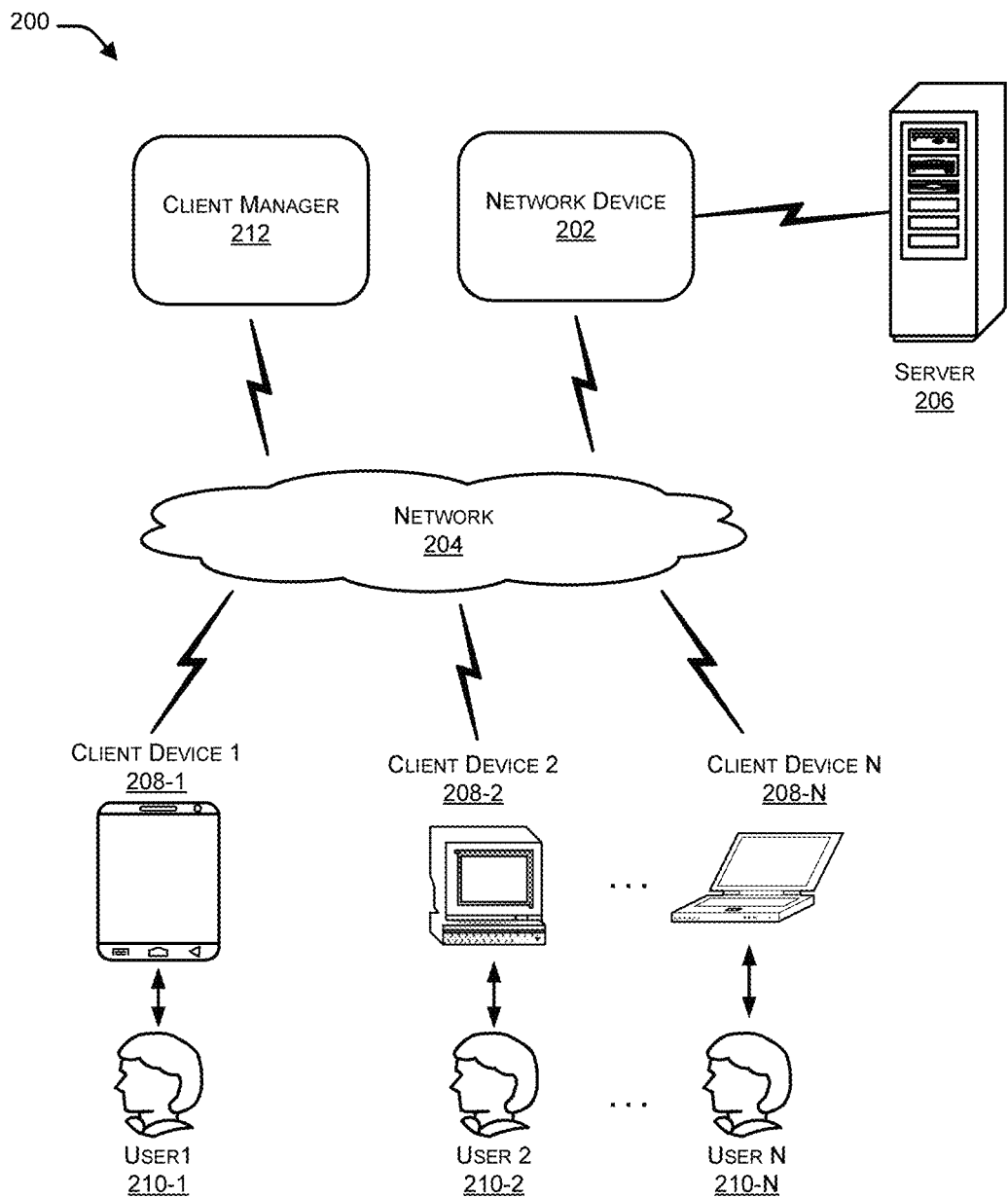
FIG. 2 is a simplified network architecture in which aspects of the present invention can be implemented in accordance with an embodiment of the present invention.

FIG. 2 is a simplified network architecture 200 in which aspects of the present invention can be implemented in accordance with an embodiment of the present invention.

In context of the present example, network architecture 200 may include, a cloud based service including, for example, a client manager 212, a network device 202 and a server 206. Network device 202 and client manager 212 can communicate with client devices 208-1, 208-2, . . . , 208-N (which may be collectively referred to as client devices 208 and individually referred to as client device 208, hereinafter) of an enterprise network 204, which can allow respective users 210-1, 210-2, . . . , 210-N (which may be collectively referred to as users 210 and individually referred to as user 210, hereinafter) to interact with various computing devices within network 204. Client devices 208 can include, but are not limited to, personal computers, smart devices, web-enabled devices, hand-held devices, laptops, mobile phones and the like, to enable interaction with network 204.

Those skilled in the art will appreciate that, network 204 can be wireless network, wired network or a combination thereof that can be implemented as one of the different types of networks, such as Intranet, Local Area Network (LAN), Wide Area Network (WAN), Internet, and the like. Further, network 204 can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

In an embodiment, network device 202 and client manager 212 can be configured to assist client devices 208 with determining their connection status. In embodiments of the present invention, client devices 208 may use any or a combination of a first connection status check, a second connection status check, and a third connection status check. One reason for employing multiple connection status checks is due to the difficulty of keeping the client device 208 in sync with the current state of the enterprise network as noted above. As such, to the extent the configuration information that would normally facilitate the client device 208 determining its on-net/off-net status is out-of-date, and the connection status check relying on that configuration information fails, there are two other connection status checks that can be used. If any of the connection status checks indicate the client device 208 is on-net, then the status of the client device 208 is on-net. The first connection status check can involve an endpoint security program running on client device 208 maintaining a list and/or ranges of public IP addresses associated with network 204 and comparing information obtained by the endpoint security program regarding the public IP address of client device 208 to the list. For example, a process running on client device 208, for example, an endpoint security program, can send a request to network device 202 to obtain information regarding the IP address that has been assigned to client device 208. Upon receiving the request, network device 202 can send a response to the client 208 including the IP address of client device 208 and the endpoint security program running on client device 208 can determine the connection status of client device 208 by comparing the public IP address of client device 208 to the list and/or ranges of public IP addresses associated with network 204. Responsive to determining the IP address of client device 208 is in the list, the connection status of client device 208 can be determined to be on-net, otherwise the connection status can be determined to be off-net (subject to performing one or more other of multiple connection status checks). In an example, network device 202 can be part of a subscription security service, which can detect probable attacks and breaches and can take preventive measures to secure the client device 208. In addition, the request and the response between client device 208 and network device 202 can be performed using any or a combination of Domain Name System (DNS) protocol, HTTP protocol, HTTPS protocol, and the like. Those skilled in the art will appreciate there exist a number of services that can provide a requesting device with its public IP address. Non-limiting examples of such services include https://www.whatismyip.com, https://whatismyipaddress.com, and https://www.iptrackeronline.com.

The second connection status check can involve determining whether a connection can be established by the client device with a first type of client management entity, for example, an Enterprise Management Server (EMS) of client manager 212. In one embodiment, the endpoint security program maintains a list of subnets and corresponding gateway MAC addresses associated with enterprise network 204. When the first connection status check indicates that client device 208 is not connected to network 204, then client device 208 can attempt to connect to client manager 212 based on one or more of a subnet to which client device 208 is connected and a default gateway IP address configured for client device 208. Client device 208 can communicate with client manager 212 using one or more of validation and ID protection (VIP) credentials and different internal DNS resolutions. Further, when the attempt to connect to client manager 212 is successful, the connection status for client device 208 can be set to a value that indicates client device 208 to be connected to network 204. The attempt to connect to client manager 212 can be performed via any or a combination of an IP address and an internal Uniform Resource Locator (URL).

According to an embodiment, the third connection status check can include determining whether a connection can be established with a second type of client management entity, for example, a network security device (e.g., a UTM device) associated with the enterprise network 204. The UTM device can provide a single management and reporting point for a security administrator to provide information security management for enterprise network 204. When the first connection status check and the second connection status check indicate that client device 208 is not connected to network 204, then client device 208 may attempt to connect to the UTM device, based on one or more of a subnet to which client device 208 is connected and a default gateway IP address configured for client device 208. Further, when the attempt to connect to UTM is successful, the connection status for client device 208 can be set to a value that indicates client device 208 to be connected to network 204.

While in the example described above, the multiple connection status checks are performed serially and in a particular order. It is noted that client device 208 can perform the multiple connection status checks in a different order than described above or in parallel and the results of the connection status checks can be combined as a logical OR condition. If any of the multiple on-net/off-net connection status checks indicate client device 208 to be connected to enterprise network 204, then the connection status of client device 208 with respect to enterprise network 204 can be determined to be on-net. Alternately, as discussed, the multiple connection status checks can be performed sequentially until one of the checks result in an on-net determination or until all the connection status checks have been exhausted.

Figure 3:
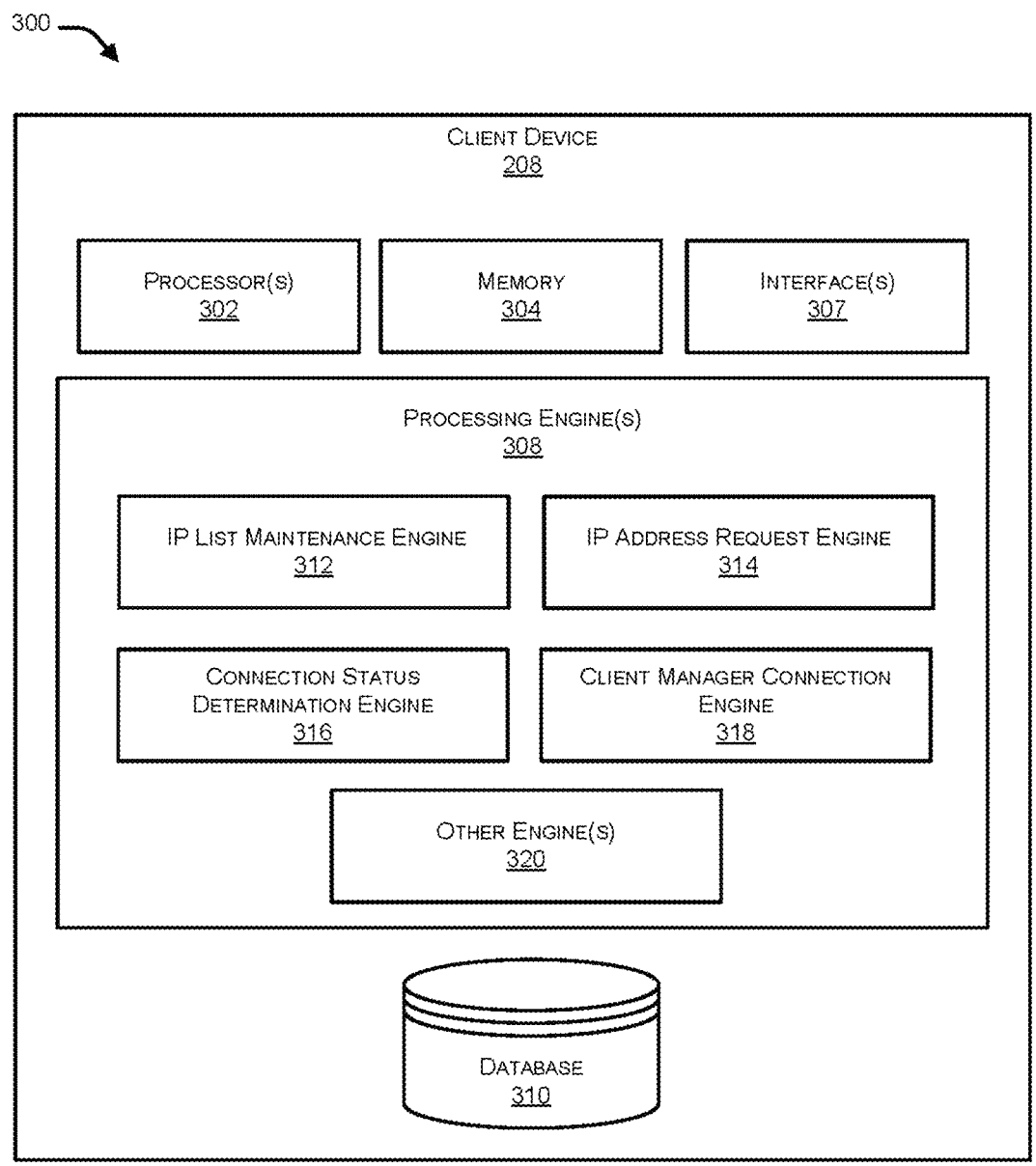
FIG. 3 is a block diagram illustrating functional components of a client device in accordance with an embodiment of the present invention.

FIG. 3 is a block diagram 300 illustrating functional components of a client device 208 in accordance with an embodiment of the present invention.

As illustrated, client device 208 can include one or more processor(s) 302. Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 304 of client device 208. Memory 304 can store one or more computer-readable instructions or routines, which may be fetched and executed to create or share the data units over a network service. Memory 304 can include any non-transitory storage device including, for example, volatile memory such as RAM, or non-volatile memory such as EPROM, flash memory, and the like. In an example embodiment, memory 304 may be a local memory or may be located remotely, such as a server, a file server, a data server, and the Cloud.

Client device 208 can also include one or more interface (s) 307. Interface(s) 307 may include a variety of interfaces, for example, interfaces for data input and output devices, referred to as I/O devices, storage devices, and the like. Interface(s) 307 may facilitate communication of client device 208 with various devices coupled to client device 208. Interface(s) 307 may also provide a communication pathway for one or more components of client device 208. Examples of such components include, but are not limited to, processing engine(s) 308 and database 310.

Processing engine(s) 308 can be implemented as a combination of hardware and software or firmware programming (for example, programmable instructions) to implement one or more functionalities of engine(s) 308. In the examples described herein, such combinations of hardware and software or firmware programming may be implemented in several different ways. For example, the programming for the engine(s) may be processor executable instructions stored on a non-transitory machine-readable storage medium and the hardware for engine(s) 308 may include a processing resource (for example, one or more processors), to execute such instructions. In the examples, the machine-readable storage medium may store instructions that, when executed by the processing resource, implement engine(s) 308. In such examples, client device 208 can include the machine-readable storage medium storing the instructions and the processing resource to execute the instructions, or the machine-readable storage medium may be separate but accessible to client device 208 and the processing resource. In other examples, processing engine(s) 308 may be implemented by electronic circuitry. Database 310 can include data that is either stored or generated as a result of functionalities implemented by any of the components of processing engine(s) 308.

In an example, processing engine(s) 308 can include an IP list maintenance engine 312, an IP address request engine 314, a connection status determination engine 316, a client manager connection engine 318, and other engine(s) 320. Other engine(s) 320 can implement functionalities that supplement applications or functions performed by client device 208 or processing engine(s) 308.

In an embodiment, IP list maintenance engine 312 can maintain a list of a range of public IP addresses associated with an enterprise network. Further, IP address request engine 314 can request that a cloud-based service provide it with information regarding the public IP address of client device 208. The public IP address of client device 208 reported by the cloud-based service can then be matched against the public IP addresses associated with the enterprise network. Based on whether the public IP address of client device 208 is present in the list, connection status determination engine 316 can determine the connection status of client device 208. When the public IP address of client device 208 is present in the list, the connection status of client device 208 can be determined to be on-net. Alternately, when the IP address of client device 208 is not present in the list, the connection status of client device 208 can be determined to be off-net (subject to performing one or more other connection status checks).

Further, IP list maintenance engine 312 can also maintain a list of subnets and corresponding gateway MAC addresses associated with the enterprise network. When the connection status, determined by comparing the received IP address with the list, indicates that the client device 208 is not connected to the enterprise network, the client manager connection engine 318 can attempt to create a connection between client device 208 and a client manager such as an EMS or a UTM. The connection can be based on a subset to which client device 208 is connected and a default gateway IP address associated with client device 208. Connection status determination engine 316 can determine the connection status of client device 208 based on state of connection attempt. Upon the connection attempt being successful, connection status determination engine 316 can determine the connection status of client device 208 as on-net, otherwise the connection status is determined to be off-net.

Figure 4A:
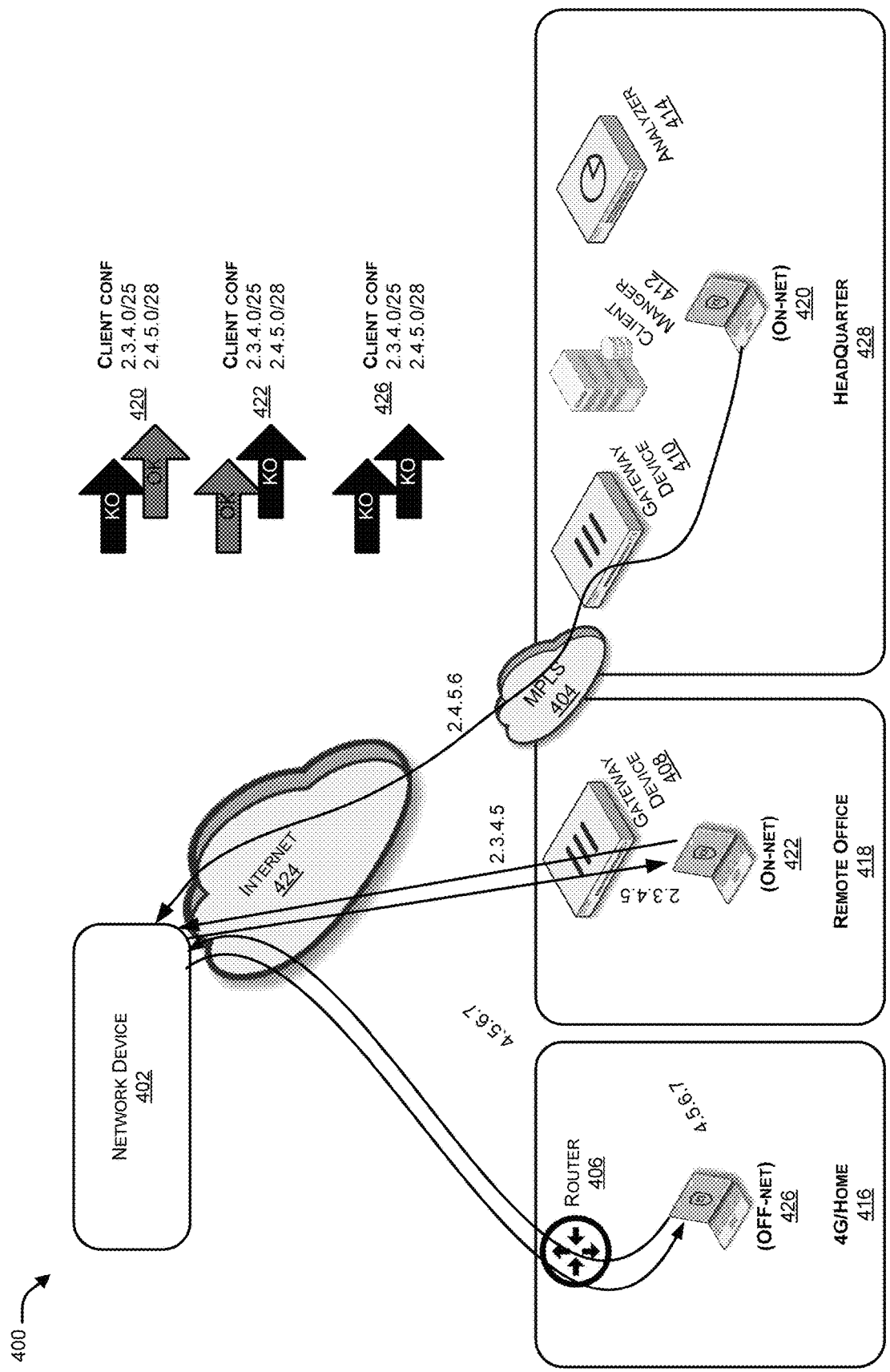
FIG. 4A is an architecture diagram illustrating various scenarios for determining a status of the client device by comparing a public IP address of the client device with an enterprise public IP list of IP addresses in accordance with an embodiment of the present invention.

FIG. 4A is an architecture diagram 400 illustrating various scenarios for determining a status of the client device by comparing a public IP address of the client device with an enterprise public IP list of IP addresses in accordance with an embodiment of the present invention.

In an embodiment, one or more client devices of an enterprise network can determine their respective connection status. For instance, in a scenarios in which client device 420 is connected to a LAN of a headquarters 428, the client device 420 can send a request to obtain its public IP address via a gateway device 410 through MIMS 404 to a cloud-based service (e.g., a network device 402). A list of one or more public IP addresses or ranges of public IP addresses associated with the enterprise network (e.g., 2.3.4.0/25 and 2.4.5.0/28) can be maintained at client device 420 in the form of client configuration information. Responsive to receiving the request from client device 420, network device 402 can respond to client device 420 with a packet containing the public IP address of client device 420. The client device 420 can then compare the received public IP address to IP addresses present in the list (e.g., its configuration information). When the public IP address of client device 420 matches an IP address present in the list, the connection status of client device 420 is determined to be on-net; otherwise, the connection status can be determined to be off-net (subject to performing one or more other connection status checks). In the context of the present example, the public IP address of client device 420 (i.e., 2.4.5.6) matches the second entry in its configuration information.

In a scenario involving client device 422 located at a remote office 418, the client device 422 can send a request to obtain its public IP address via a gateway device 408 to cloud-based service (e.g., network device 402). A list containing one or more public IP addresses or ranges of public IP addresses associated with the enterprise network (e.g., 2.3.4.0/25 and 2.4.5.0/25) can be maintained at client device 422 in the form of client configuration information. Based on the request from client device 422, network device 402 may issue a response to client device 422 containing the public IP address of client device 422. Client device 422 can then compared its public IP address to the IP addresses present in the list (e.g., its configuration information). When the public IP address of client device 422 matches an IP address present in the list, the connection status of client device 422 is determined to be on-net; otherwise, the connection status can be determined to be off-net (subject to performing one or more other connection status checks). In the context of the present example, the public IP address of client device 422 (i.e., 2.3.4.5) matches the first entry in its configuration information.

Similarly, in a scenario involving client device 426 connected to a 4G/home endpoint location 416, client device 426 can send a request to obtain its public IP address via a router 406 through Internet 424 to cloud-based service (e.g., network device 402). A list containing one or more public IP addresses or ranges of public IP addresses associated with the enterprise network (e.g., 2.3.4.0/25 and 2.4.5.0/25) can be maintained at client device 426 in the form of client configuration information. Based on the request from client device 426, network device 402 may issue a response to client device 426 containing the public IP address of client device 462. Client device 426 can then compared its public IP address to the IP addresses present in the list (e.g., its configuration information). When the public IP address of client device 426 matches an IP address present in the list, the connection status of client device 426 is determined to be on-net; otherwise, the connection status can be determined to be off-net (subject to performing one or more other connection status checks). In the context of the present example, the public IP address of client device 422 (i.e., 4.5.6.7) does not match any of the entries in its configuration information.

According to an implementation, a list of all the public IP addresses associated with the enterprise network can be maintained at the client manager 412, which can periodically or responsive to an event distribute the list to each of client devices 420, 422, and 426, for example, responsive to any changes to the list. Thus, the client devices 420, 422 and 426 are kept in sync to facilitate performance of connection status checks. As an example, the headquarters 428 can have two different WANs with client devices having IP addresses (e.g. 22.33.44.0/26 and 66.33.44.0/26). Client device 420 at headquarter endpoint location 428 can have an IP address (e.g. 11.22.33.0/29). Client device 422 at remote office endpoint location 418 can have an IP address (e.g. 22.22.33.0/29), and client device 426 at 4G/home endpoint location 416 can have an IP address (44.22.33.0/29). The list of public IP addresses associated with the enterprise network can include the IP addresses of all the client devices of the endpoint locations within the enterprise network (e.g. 22.33.44.0/26, 66.33.44.0/26, 11.22.33.0/29, 22.22.33.0/29, 44.22.33.0/29). The connection status of the client device can be determined by comparing IP address of the client device with IP addresses present in the list. Upon finding a match the connection status of the client device can be determined to be on-net otherwise the connection status is determined to be off-net.

In an embodiment, the request and the response can be exchanged between any client device 420, 422 or 426 and network device 402 using any or a combination of DNS protocol, HTTP protocol, HTTPS protocol, and the like.

Figure 4B:
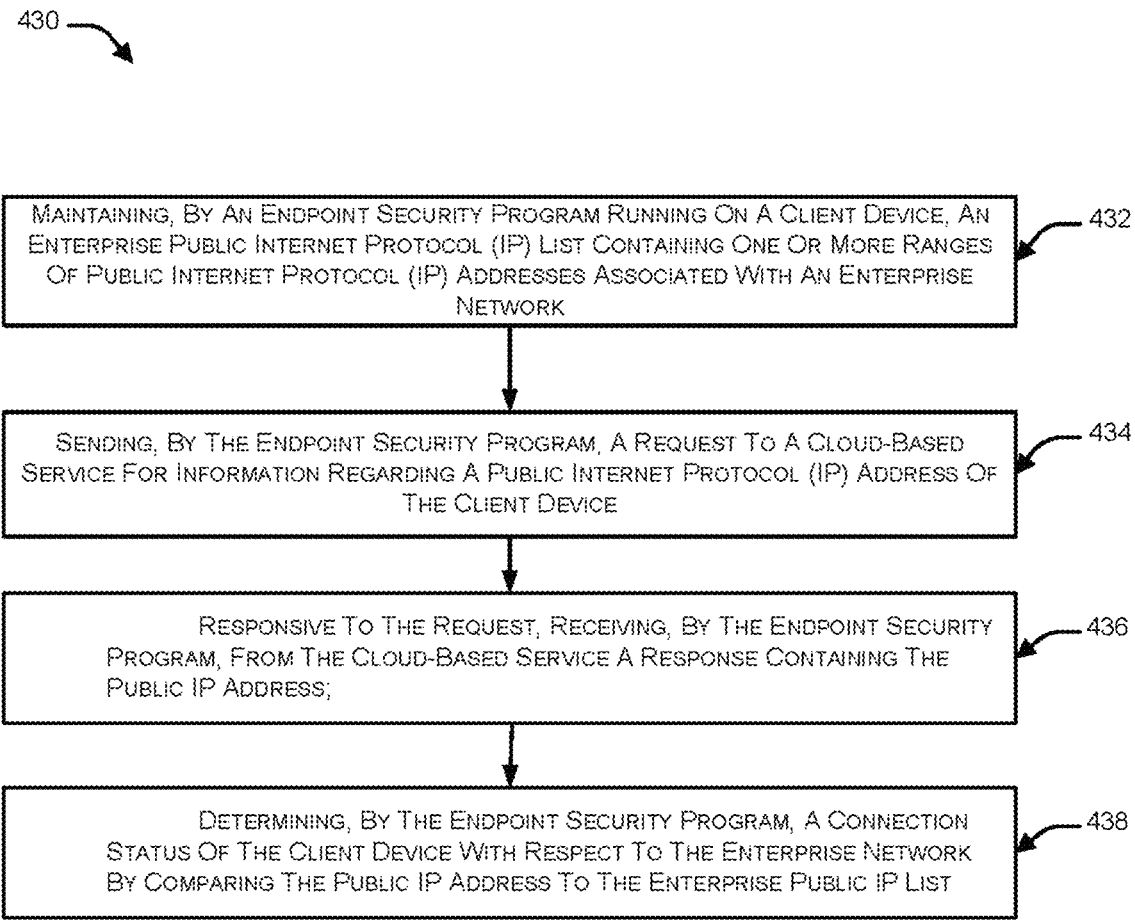
FIG. 4B is an exemplary flow diagram illustrating a process for determining a status of the client device by comparing a public IP address of the client device with an enterprise public IP list of IP addresses in accordance with an embodiment of the present invention.

FIG. 4B is an exemplary flow diagram 430 illustrating a process for determining a status of the client device by comparing a public IP address of the client device with an enterprise public IP list of IP addresses in accordance with an embodiment of the present invention.

In the context of the present example, at block 432, an enterprise public IP list containing one or more ranges of public IP addresses associated with an enterprise network is maintained by an endpoint security program running on a client device. Further, at block 434, the endpoint security program sends a request to a cloud-based service for information regarding a public IP address of the client device.

In response to the request, at block 436, the endpoint security program receives from the cloud-based service a response containing the public IP address such that at block 438, a connection status of the client device with respect to the enterprise network is determined by the endpoint security program by comparing the public IP address to the enterprise public IP list.

Figure 5A:
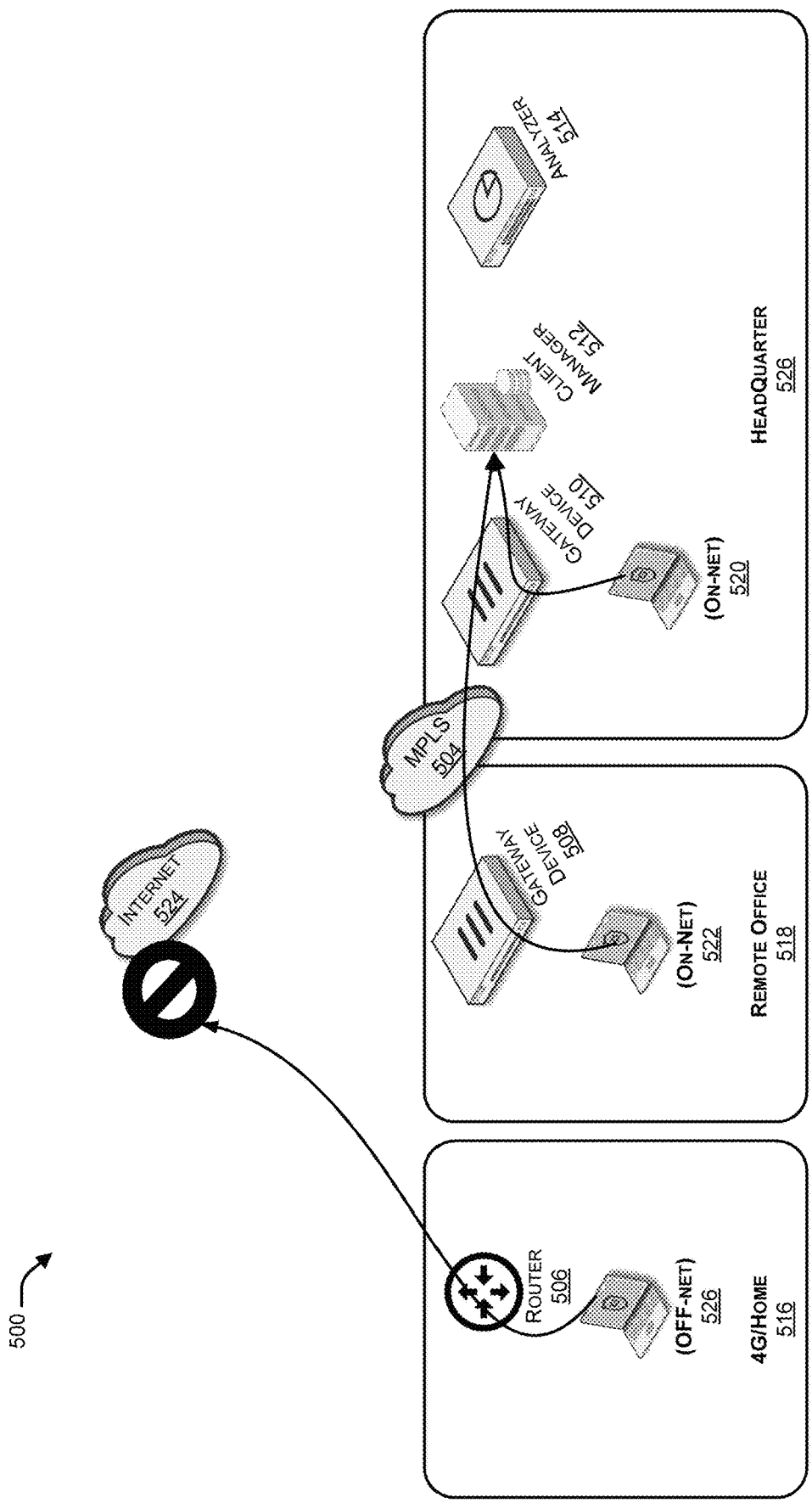
FIG. 5A is an architecture diagram for determining a status of a client device upon receiving a response from a client manager in accordance with an embodiment of the present invention.

FIG. 5A is an architecture diagram 500 for determining a status of a client device upon receiving a response from a client manager 512 in accordance with an embodiment of the present invention.

In the context of the present example, in a very large enterprise network with multiple internal networks, routable IPs for each of the available networks are provided to a client manager 512, which can include an EMS or a network security device (e.g. a UTM). In one embodiment, client devices 520, 522 and 526 can maintain a list of subnets and corresponding gateway MAC addresses associated with the enterprise network. Further, client devices 520 and 522 can communicate with client manager 512 using one or more of VIP credentials and different internal DNS resolutions.

As an example, client device 520 operating at headquarters 526 can reach client manager 512 via a gateway device 510. Client device 520 can raise a connection request by attempting to send a packet to client manager 512, where the packet specifies an IP address or a URL for establishing the connection. Upon client device 520 sharing the IP address or the URL with client manager 512, client manager 512 can send an acknowledgement packet back to client device 520. Upon receiving the acknowledgement, the connection status of client device 520 can be determined to be on-net, otherwise if the acknowledgement is not received, the connection status of client device 520 can be determined to be off-net. Further, client device 522 placed at remote office endpoint location 518 can reach client manager 512 via gateway device 508 of remote office endpoint location 518, through MPLS 504 and gateway device 510. Client device 522 can raise a connection request by sending a packet to client manager 512 mentioning an IP address or a URL for establishing the connection. Upon client device 522 sharing the IP address or the URL, client manager 512 can send an acknowledgement packet back to client device 522. Upon receiving the acknowledgement the connection status of client device 522 can be determined to be on-net otherwise the connection status can be determined to be off-net. Furthermore, client device 526 placed at 4G/home endpoint location 516 can try to reach client manager device 512 via a router 506 connected to internet 524. As a connection cannot be established between client device 526 and client manager 512 via gateway device 510, client device 526 cannot receive an acknowledgement packet from client manager 512, and hence, the connection status of client device 526 can be off-line.

Figure 5B:
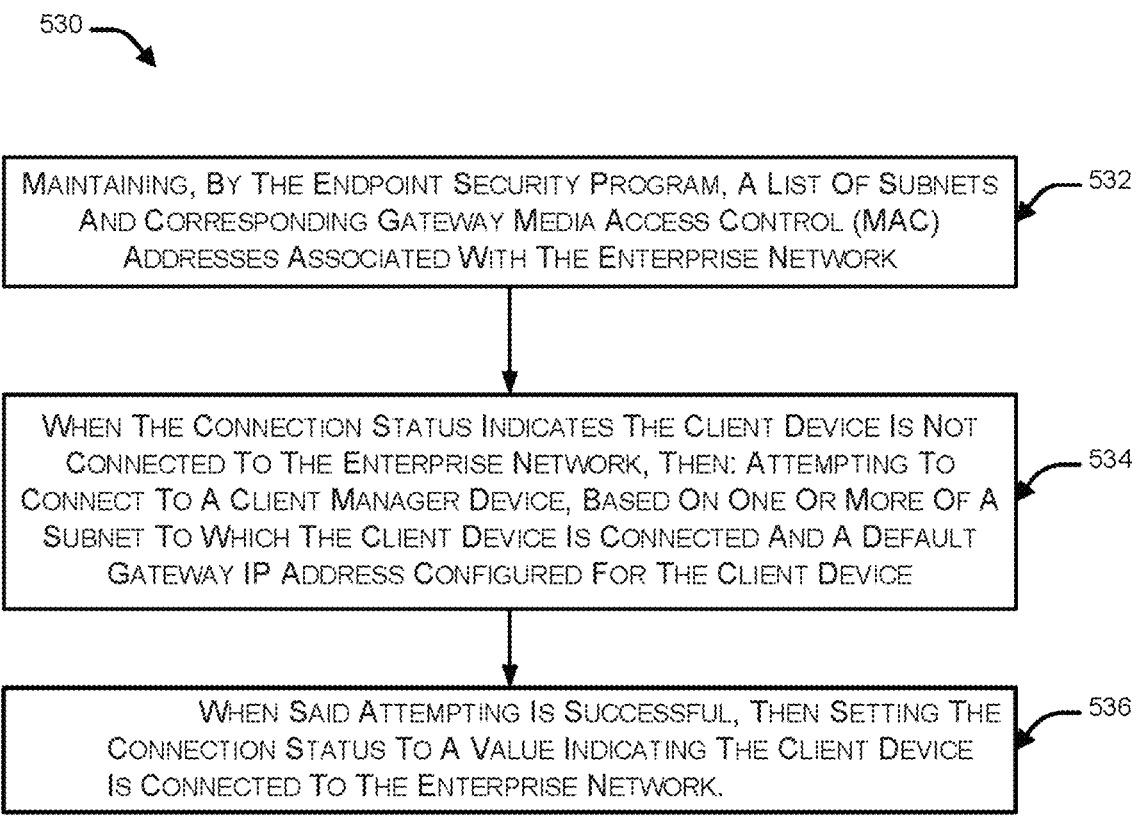
FIG. 5B is exemplary flow diagram illustrating a process for determining a status of the client device upon receiving a response from client manager in accordance with an embodiment of the present invention.

FIG. 5B is exemplary flow diagram 530 illustrating a process for determining a status of the client device upon receiving a response from client manager in accordance with an embodiment of the present invention.

In the context of the present example, at block 532, the endpoint security program maintains a list of subnets and corresponding gateway MAC addresses associated with the enterprise network. Further, at block 534, when the connection status indicates that the client device is not connected to the enterprise network, then based on the one or more of a subnet to which the client device is connected and default gateway IP address configured for the client device, a connection to a client manager device is attempted. Further, at block 536 when the attempt to connect to the client manager device is successful, the connection status of the client device set to a value, which indicates that the client device is connected to the enterprise network.

FIG. 6A illustrates an exemplary flow diagram 600 illustrating a serial process for determining a status of the client device by performing first, second and third connection status checks in accordance with an embodiment of the present invention.

In an embodiment, an endpoint security program running on a client device maintains a list of ranges of public IP addresses associated with an enterprise network. At block 604, the client device requests a cloud-based service for information regarding a public IP address of the client device. At block 606, the client device receives a response containing the requested public IP address. At block 608, it is determined whether the received IP address of the client device matches to an IP address present in the list. If IP address of the client device matches to IP address present in the list, at block 620, connection status of the client device is determined to be on-net, else at block 610, the client device attempts a connection with an EMS by sharing a data packet containing an IP address or an internal URL. At block 612, it is determined whether a response from the EMS is received. If a response from the EMS is received, at block 620, the connection status of the client device is determined to be on-net else at block 614 the client device attempts a connection with a UTM by sharing a data packet containing an IP address or an internal URL. At block 616, it is determined whether a response from the UTM is received. If a response is received from the UTM, at block 620, the connection status of the client device is determined to be on-net, else at block 622, the connection status of the client device is determined to be off-net. Therefore, multiple connection status checks may be performed sequentially until one of the connection status checks results in an on-net determination or until all the connection status checks have been exhausted.

In an implementation, an administrator may provide a list containing subnets associated with a private network as well as MAC addresses for gateways of each subnet to the client device. The connection status of the client device can be determined to be on-net when the client device is connected to one of input subnets present on the list and when MAC address of default gateway of the client device matches to the list of MAC addresses for the gateways such that when the connection status is determined to be off-net, the process can continue to perform the first connection status check, the second connection status check and the third connection status check in accordance with various embodiments of the present disclosure.

Figure 6B:
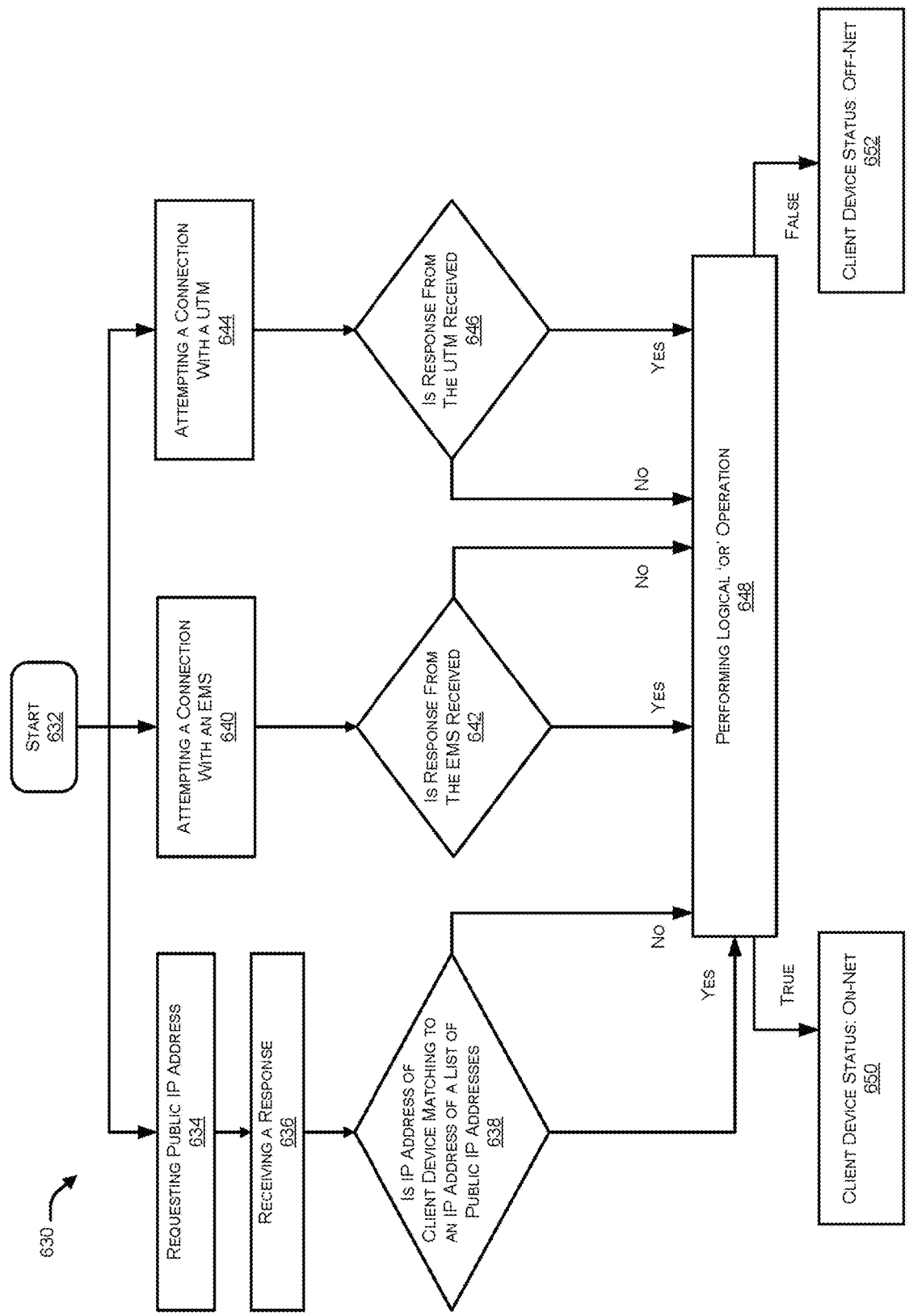
FIG. 6B illustrates an exemplary flow diagram illustrating a parallel process for determining a status of the client device by performing first, second and third connection status checks in accordance with an embodiment of the present invention.

FIG. 6B illustrates an exemplary flow diagram 630 illustrating a parallel process for determining a status of the client device by performing first, second and third connection status checks in accordance with an embodiment of the present invention.

In an embodiment, an endpoint security program running on a client device maintains a list of ranges of public IP addresses associated with an enterprise network. At block 634, a client device requests a cloud-based service for information regarding a public IP address of the client device. At block 636, the client device receives a response containing the public IP address so that the list can be evaluated to determine whether IP address of client device is present in the list. At block 638, it is determined whether IP address of the client device matches to an IP address present in the list. Result obtained at block 638 is provided as input to block 648. Further, at block 640, the client device attempts a connection with an EMS by sharing a data packet containing an IP address or an internal URL. At block 642, it is determined that whether a response from the EMS is received in response to the attempt. Result obtained at block 642 is provided as input to block 648. Similarly, at block 644, the client device attempts a connection with a UTM and at block 646, it is determined that whether a response from the UTM is received in response to the attempt. The result obtained at block 646 can be provided to block 648. At block 648, a logical OR operation is performed on the results obtained from block 638, 642 and 646. If the result at block 648 results in a true value, at block 650, the connection status of the client device can be declared as on-net. Further, if the result at block 648 results in a false value, at block 652, the connection status of the client device can be declared as off-net. Therefore, if any of the multiple on-net/off-net connection status checks indicate that the client device is connected to the enterprise network, then the connection status of the client device with respect to the enterprise network is on-net.

Figure 7:
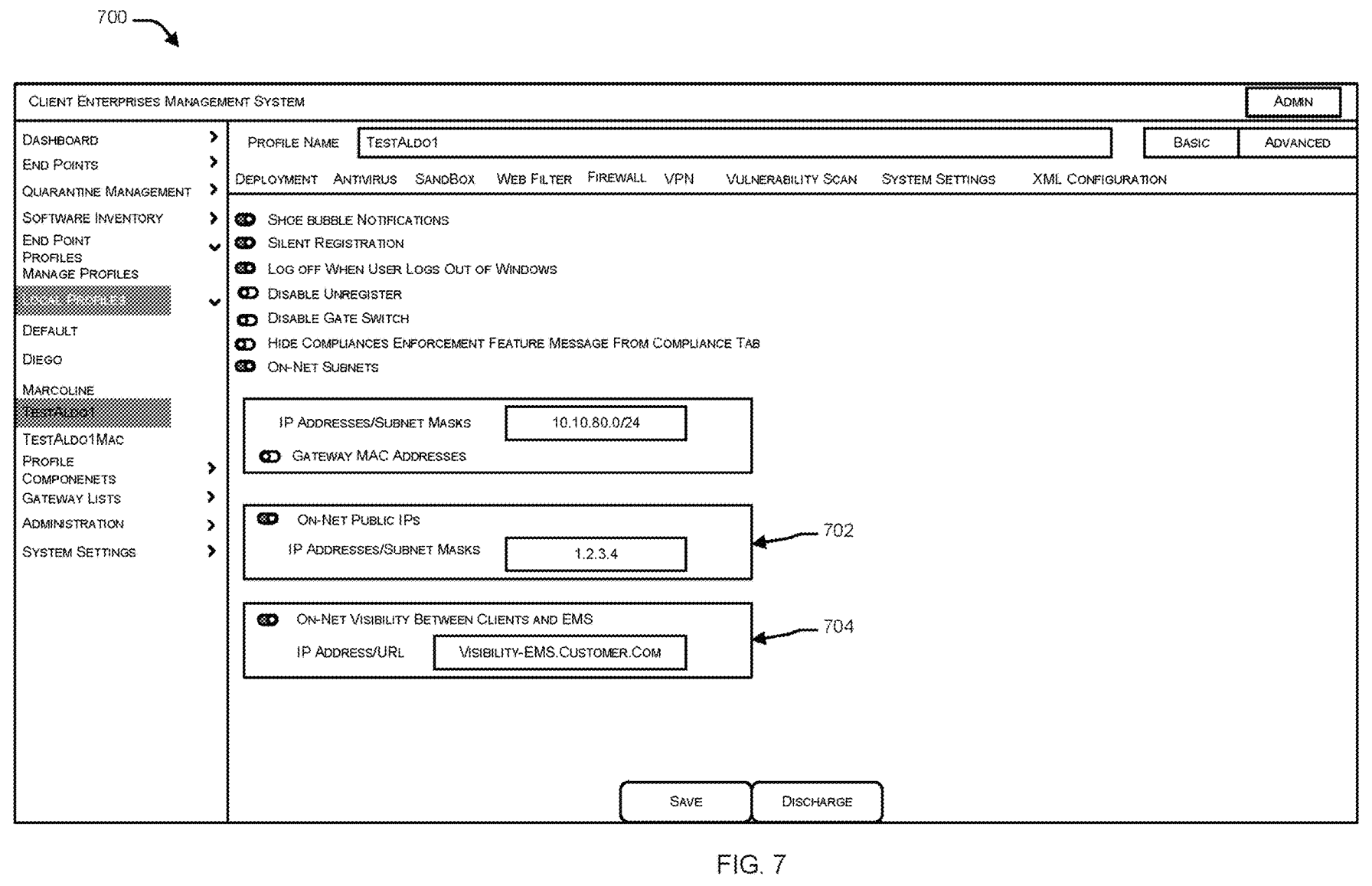

FIG. 7 illustrates an exemplary client enterprise management interface 700 for determination of the client device status in accordance with an embodiment of the present invention. In an embodiment, the client enterprise management interface configures the manner in which client devices will determine their respective connection status by using any or a combination of the first (e.g., IP addresses/subnet masks), or the second (on-net public IPs 702) or the third (on-net visibility between clients and EMS 704) connection status checks. The connection status can be determined by using any of available status checks at the client enterprise management interface. In an embodiment, the first, the second and the third connection status checks can be performed in parallel and their results can be combined as a logical OR condition.

Figure 8:
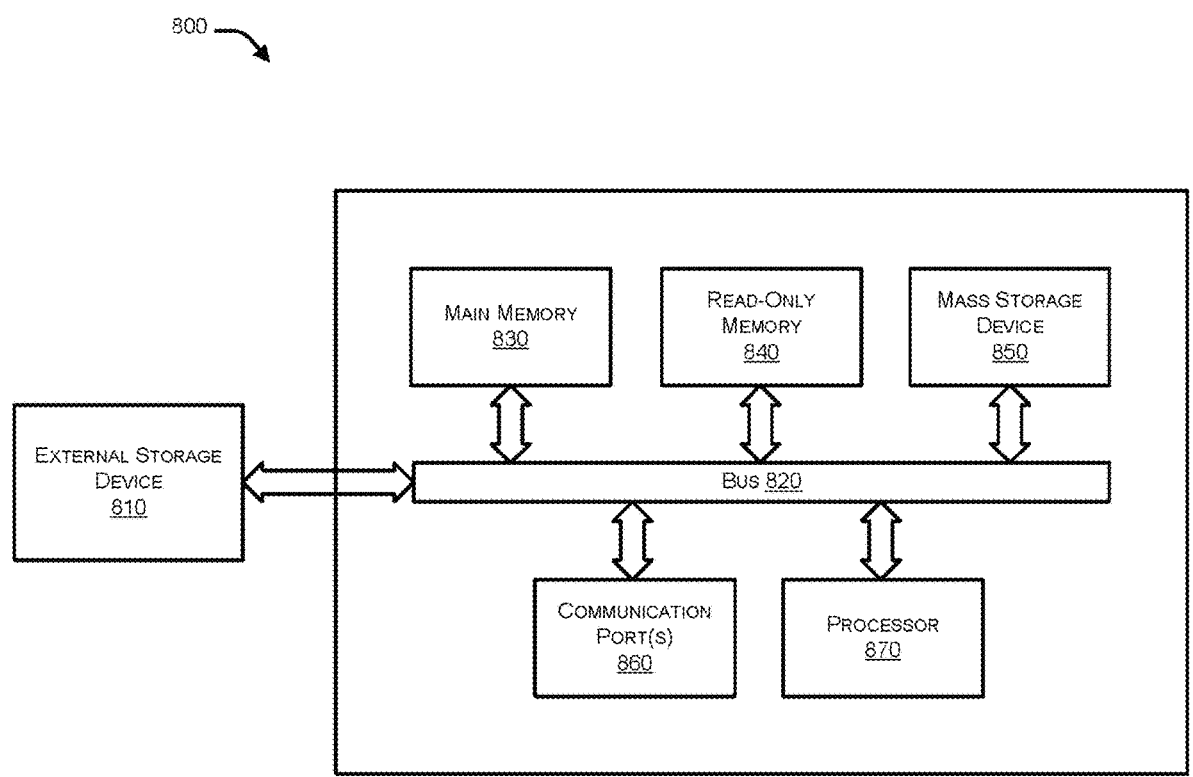
FIG. 8 illustrates an exemplary computer system in which or with which embodiments of the present invention may be utilized.

FIG. 8 illustrates an exemplary computer system 800 in which or with which embodiments of the present invention can be utilized. Computer system 800 may represent all or part of a client device (e.g., client device 208, 420, 422, 426, 520, 522, or 526), a client manager (e.g., client manager 212, 412, or 512), a network device (e.g., network device 202) or server (e.g., server 206).

As shown in FIG. 8, computer system includes an external storage device 810, a bus 820, a main memory 830, a read only memory 840, a mass storage device 850, a communication port 860, and a processor 870. Computer system 800 may represent some portion of client device 208.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, FortiSOCTM system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    maintaining, by an endpoint security program running on a client device, an enterprise public Internet Protocol (IP) list containing one or more ranges of public Internet Protocol (IP) addresses associated with an enterprise network;
    sending, by the endpoint security program, a request to a cloud-based service for information regarding a public Internet Protocol (IP) address of the client device;
    responsive to the request, receiving, by the endpoint security program, from the cloud-based service a response containing the public IP address; and
    determining, by the endpoint security program, a connection status of the client device with respect to the enterprise network by comparing the public IP address to the enterprise public IP list.

2. The method of claim 1, wherein the cloud-based service comprises a subscription security service.

3. The method of claim 1, wherein the request and the response are exchanged between the client device and a subscription security service using any or a combination of Domain Name System (DNS) protocol, HyperText Transfer Protocol (HTTP) protocol and Hypertext Transfer Protocol Secure (HTTPS) protocol.

4. The method of claim 1, wherein the method further comprises:
    maintaining, by the endpoint security program, a list of subnets and corresponding gateway media access control (MAC) addresses associated with the enterprise network; and
    when the connection status indicates the client device is not connected to the enterprise network, then:
        attempting to connect to a client manager device, based on one or more of a subnet to which the client device is connected and a default gateway IP address configured for the client device; and
        when said attempting is successful, then setting the connection status to a value indicating the client device is connected to the enterprise network.

5. The method of claim 4, wherein said attempting to connect is via any or a combination of the gateway IP address and an internal Uniform Resource Locator (URL).

6. The method of claim 4, wherein the client manager device comprises an enterprise management server (EMS).

7. The method of claim 4, wherein the client device communicates with the client manager device using one or more of validation and ID protection (VIP) credentials and different internal DNS resolutions.

8. The method of claim 4, wherein the client manager device comprises a network security device.

9. The method of claim 8, wherein the network security device comprises a unified threat management device (UTM).

10. A non-transitory computer-readable storage medium embodying a set of instructions, which when executed by one or more processors of a client device, causes the one or more processors to perform a method comprising:
    maintaining, by an endpoint security program running on the client device, an enterprise public Internet Protocol (IP) list containing one or more ranges of public Internet Protocol (IP) addresses associated with an enterprise network;
    sending, by the endpoint security program, a request to a cloud-based service for information regarding a public Internet Protocol (IP) address of the client device;
    responsive to the request, receiving, by the endpoint security program, from the cloud-based service a response containing the public IP address; and
    determining, by the endpoint security program, a connection status of the client device with respect to the enterprise network by comparing the public IP address to the enterprise public IP list.

11. The non-transitory computer-readable storage medium 10, wherein the cloud-based service comprises a subscription security service.

12. The non-transitory computer-readable storage medium 10, wherein the request and the response are exchanged between the client device and a subscription security service using any or a combination of Domain Name System (DNS) protocol, HyperText Transfer Protocol (HTTP) protocol and Hypertext Transfer Protocol Secure (HTTPS) protocol.

13. The non-transitory computer-readable storage medium 10, wherein the method further comprises:
    maintaining, by the endpoint security program, a list of subnets and corresponding gateway media access control (MAC) addresses associated with the enterprise network; and
    when the connection status indicates the client device is not connected to the enterprise network, then:
        attempting to connect to a client manager device, based on one or more of a subnet to which the client device is connected and a default gateway IP address configured for the client device; and
        when said attempting is successful, then setting the connection status to a value indicating the client device is connected to the enterprise network.

14. The non-transitory computer-readable storage medium 13, wherein said attempting to connect is via any or a combination of the gateway IP address and an internal Uniform Resource Locator (URL).

15. The non-transitory computer-readable storage medium 13, wherein the client manager device comprises an enterprise management server (EMS).

16. The non-transitory computer-readable storage medium 13, wherein the client device communicates with the client manager using one or more of validation and ID protection (VIP) credentials and different internal DNS resolutions.

17. The non-transitory computer-readable storage medium 13, wherein the client manager device comprises a network security device.

18. The non-transitory computer-readable storage medium 17, wherein the network security device comprises a unified threat management device (UTM).

19. A client device, comprising:
    a processor running an endpoint security program;
    a network interface; and
    a memory, storing:
        a first module to maintain an enterprise public Internet Protocol (IP) list containing one or more ranges of public Internet Protocol (IP) addresses associated with an enterprise network;
        a second module to send a request to a cloud-based service for information regarding a public Internet Protocol (IP) address of the client device;
        a third module to receive, responsive to the request, from the cloud-based service a response containing the public IP address; and
        a fourth module to determining a connection status of the client device with respect to the enterprise network by comparing the public IP address to the enterprise public IP list.

* * * * *